US012718352B2

(12) United States Patent
Grillet et al.

(10) Patent No.: US 12,718,352 B2
(45) Date of Patent: Aug. 25, 2026

(54) METHOD FOR MANUFACTURING A DECOR SHEET FOR DECORATIVE PANEL

(71) Applicants: Unilin, BV, Wielsbeke (BE); Interprint GmbH, Arnsberg (DE)

(72) Inventors: Bastien Grillet, Wielsbeke (BE); Christophe Maesen, Lichtervelde (BE); Benjamin Clement, Waregem (BE)

(73) Assignees: Unilin, BV, Wielsbeke (BE); Interprint GmbH, Arnsberg (DE)

( * ) Notice: Subject to any disclaimer, the term of this patent is extended or adjusted under 35 U.S.C. 154(b) by 262 days.

(21) Appl. No.: 18/293,237

(22) PCT Filed: Jul. 19, 2022

(86) PCT No.: PCT/IB2022/056612
§ 371 (c)(1),
(2) Date: Jan. 29, 2024

(87) PCT Pub. No.: WO2023/007306
PCT Pub. Date: Feb. 2, 2023

(65) Prior Publication Data

US 2025/0078247 A1 Mar. 6, 2025

(30) Foreign Application Priority Data

Jul. 28, 2021 (EP) .................................... 21188280

(51) Int. Cl.
*G06T 7/00* (2017.01)
*B41M 3/00* (2006.01)
(Continued)

(52) U.S. Cl.
CPC ............. *G06T 7/001* (2013.01); *B41M 3/008* (2013.01); *B41M 5/0005* (2013.01); *G06T 3/40* (2013.01);
(Continued)

(58) Field of Classification Search
CPC . G06T 7/001; G06T 3/40; G06T 2207/20021; G06T 2207/30144;
(Continued)

(56) References Cited

U.S. PATENT DOCUMENTS

2009/0135239 A1* 5/2009 Chretien ............. B41F 23/0409 347/102
2019/0061317 A1* 2/2019 Karthikeyan ......... B44C 5/0446
2024/0336077 A1* 10/2024 Grillet .................. B41M 5/0005

FOREIGN PATENT DOCUMENTS

EP 1872959 B1 7/2009
EP 1290290 B1 1/2010
(Continued)

*Primary Examiner* — Delomia L Gilliard
(74) *Attorney, Agent, or Firm* — Capitol City TechLaw

(57) ABSTRACT

A method is provided for manufacturing a printed décor sheet. The method may involve providing a first printable or printed substrate. At least one predetermined operation may be performed on the substrate, wherein the predetermined operation causes the deformation of the substrate in at least one direction. The deformation may be measured to obtain at least one deformation parameter. A first master image may be provided. An image processing operation may be performed on the first master image to obtain a second master image. The second master image may be printed on a second printable substrate to obtain the décor sheet. The image processing operation may involve at least modifying the first master image on the basis of the at least one deformation parameter.

19 Claims, 3 Drawing Sheets

(51) Int. Cl.
*B41M 5/00* (2006.01)
*B44C 5/04* (2006.01)
*B44F 9/02* (2006.01)
*G06T 3/40* (2024.01)

(52) U.S. Cl.
CPC .................................... *B44C 5/04* (2013.01); *B44F 9/02* (2013.01); *G06T 2207/20021* (2013.01); *G06T 2207/30144* (2013.01)

(58) Field of Classification Search
CPC ........ B41M 3/008; B41M 5/005; B41M 5/52; B41M 3/06; B44C 5/04; B44F 9/02
See application file for complete search history.

(56) References Cited

FOREIGN PATENT DOCUMENTS

| | | | | |
|---|---|---|---|---|
| EP | 1857511 | B1 | 9/2011 | |
| EP | 2293946 | B1 | 1/2012 | |
| EP | 2500177 | A2 * | 9/2012 | .......... B41J 11/0015 |
| EP | 2431190 | B1 | 9/2013 | |
| WO | 2011124503 | A2 | 10/2011 | |
| WO | 2014084787 | A1 | 6/2014 | |
| WO | 2015118451 | A1 | 8/2015 | |
| WO | 2015140682 | A1 | 9/2015 | |

* cited by examiner 1
2
3
18
19
20
X
Y
PU
6
7
8
9
10
11
12
13
14
15
16
29

Fig. 2
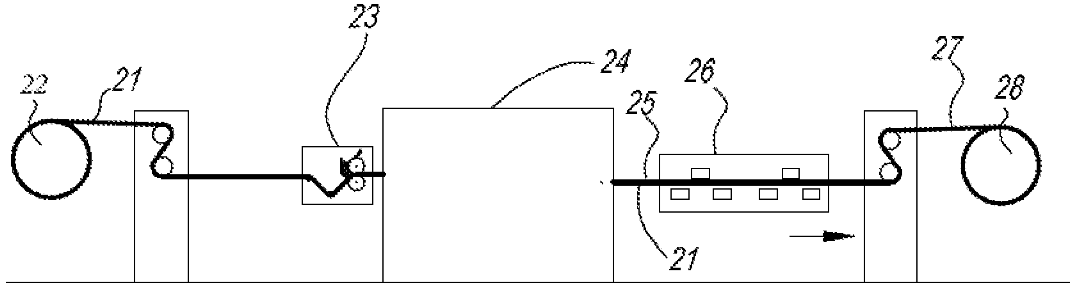
Fig. 4
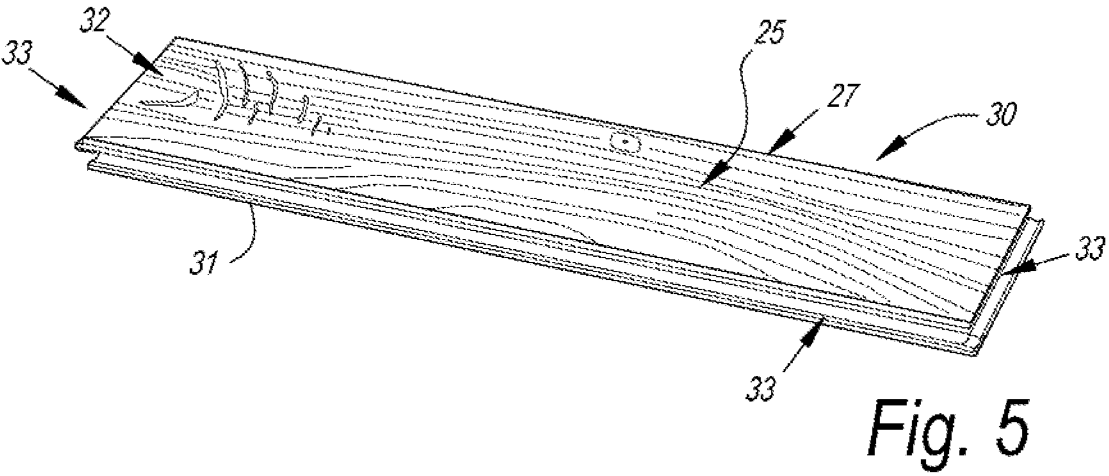
Fig. 5

29
27
14
14
12
29
10
11
6
13
8
9
27
28

41
6
44
5
27
6
31
43
6
42
46
45
25
4
45
40

METHOD FOR MANUFACTURING A DECOR SHEET FOR DECORATIVE PANEL

This application claims priority under 35 USC § 119(a)-(d) from EP patent application Ser. No. 21/188,280.8, which was filed on Jul. 28, 2021, the entire content of which is incorporated herein by reference.

BACKGROUND

1. Field

The present invention relates a method for manufacturing a décor paper of the type used in panels having a decorative surface, or so-called decorative panels. The invention also relates to a method for manufacturing such panels.

More particularly the invention is related to a method for manufacturing décor papers that are heat pressed on top of a substrate for forming said panels. The panels obtainable with the method of the invention may relate to furniture panels, ceiling panels, flooring panels or similar, wherein these panels preferably comprise a wood-based substrate, such as an MDF or HDF substrate (Medium or High Density Fiberboard) or a substrate material consisting of or essentially made of wood particleboard.

2. Related Art

Traditionally, the decor pattern of such panels is printed on paper sheet by means of offset or rotogravure printing. The obtained paper is taken up as a decorative paper in a so-called laminate panel. For manufacturing the panels the DPL process can be practiced. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to EP 1 290 290, from which it is further known to provide a relief in said melamine surface during the same press treatment or pressing operation, namely by bringing said melamine surface in contact with a structured press element, for example a structured press plate. Preferably, said relief can be in register with the pattern on the decorative layer.

The printing of the sheet by means of an analog printing process, such as by rotogravure or offset printing, at affordable prices inevitably leads to large minimal order quantities of a particular decorative paper or foil and restricts the attainable flexibility. A change of decor or pattern necessitates a standstill of the printing equipment of about 8 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns. Such digital techniques can enhance the flexibility in the printing of decors significantly. Reference is amongst others made to EP 1 872 959, WO 2011/124503, EP 1 857 511, EP 2 431 190, EP 2 293 946, WO 2014/084787, WO 2015/140682 and WO 2015/118451, where such techniques are disclosed.

During private research, the inventor has also encountered problems with subsequent impregnation and lamination of printed paper. In particular, the inventor has encountered problems with expansion and deformation of the décor paper during impregnation with resin like melamine. The inventor has noticed that impregnation can cause deformation of the décor paper and of the printed pattern thereof thereby complicating the pressing in register of the relief.

SUMMARY

The present invention aims in the first place at an alternative method for manufacturing decorative sheets that, in accordance with several of its preferred embodiments, is directed to solve one or more of the problems arising in the state of the art.

Therefore the present invention, in accordance with its first independent aspect, relates to a method for manufacturing a printed décor sheet comprising the steps of: providing a first printable or printed substrate; performing at least one predetermined operation on said substrate, wherein said predetermined operation causes the deformation of the substrate in at least one direction; measuring said deformation to obtain at least one deformation parameter; providing a first master image; performing an image processing operation on said first master image to obtain a second master image; printing said second master image on a second printable substrate to obtain the décor sheet. In accordance with the first aspect of the invention said image processing operation involves at least modifying the first master image on the basis of said first deformation parameter. In this way it is possible to predict what will be the deformation and compensate said deformation in the pattern through the image processing operation that is based on said predicted deformation. Said image processing operation involves modifying the first master image on the basis of at least a modification parameter that is function of said first deformation parameter. For example, said at least first deformation parameter can be a scale parameter and said image processing operation may involve enlarging or reducing the dimension of said first master image on the basis of said at least first deformation parameter. Preferably, said image processing operation may involve deforming said first master image of a deformation that is opposite to the measured deformation. In this way, for example, it is possible to compensate a predicted expansion caused by said predetermined operation by contracting the first master image for obtaining the second master image. Because of the predetermined operation, the printed second master image will expand as predicted so that the dimensions of the original first master image are restored. Preferably the image processing operation can involve a preliminary operation of calculating one or more modification parameter on the basis of said deformation parameter. Subsequently, the image processing operation may involve applying the modification parameter to the first master image in order to obtain the second master image.

Said deformations can comprise linear and non-linear expansion along the length and/or width direction of the first printable or printed substrate, bowing of the first substrate and/or parallelogram deformation, i.e. differentiated linear expansion along the length and/or width direction of the first printable or printed substrate.

According to the invention multiple deformation parameter can be measured. For example, deformation in multiple different direction can be measured. It is also possible to measure multiple deformation parameters in a same direction. For example, said deformation parameters in a same direction can be measured in multiple points of the first substrate. In this way a more accurate image processing operation can be performed based on multiple parameters or on one or more deformation parameter calculated on the basis of said parameters.

In the most preferred embodiment, the method comprises the step of identifying a plurality of sectors on the surface of said first printable or printed substrate and measuring said deformation to obtain at least one deformation parameter for each of said sectors. In fact, the inventor has observed that the predetermined operation can have different effect in different portions of the substrate, therefore by identifying said sectors and by measuring the deformation parameters in each sector it is possible to obtain a more realistic and precise estimate of the deformation. In the preferred embodiment, said sectors are configured to divide the substrate in a grid or raster manner. Preferably said sectors may show all the same dimension and/or shape, in this way it may be possible to optimize the distribution of said sectors on the first printable or printed substrate.

Each of said sectors on the first substrate can correspond to a respective area of the first master image so that said image processing operation may involve modifying each area of the first master image on the basis of said first deformation parameter measured in the respective sector. For example, each area can be modified on the basis of a respective modification parameter, for example that has been previously calculated on the basis of a respective deformation parameter.

The deformation parameters are stored in a memory device connected to a processing unit, for example a personal computer. This processing device may further be configured for performing the image processing operation on the first master image, thereby providing as an output, of this image processing operation, the second master image.

Said deformation can be measured with one or more measuring devices. Said measuring devices can comprise optical sensor, haptic sensor, mechanical sensor and/or electromagnetic sensor. Said sensor can be connected, even wireless, with the processing unit and/or directly with the memory.

The first substrate can comprise or be provided with a predetermined amount of ink before being subjected to said predetermined operation. In particular the method can comprise the step of providing a printed first substrate, i.e. a first substrate that has been previously provided with a predetermined amount of ink, for example by taking said printed first substrate from a stock. Alternatively, the method may comprise the step of providing a blank first substrate with a predetermined amount of at least one ink, for example a step of printing, preferably inkjet printing, said ink onto said substrate. Said predetermined amount of ink can be preferably uniformly distributed onto said first substrate. Said ink can be a pigment containing ink and said substrate can comprise or be provided with a pigment dry weight comprised between 0.1 g/sqm and 15 g/sqm.

In the preferred embodiment said predetermined amount of ink on the first substrate is selected on the basis of the first and/or the second master image to be printed. In fact, it may be possible to estimate the amount of ink that has to be printed onto a substrate for reproducing said first and/or second master image, and the predetermined amount of ink on said first substrate can be selected on the basis of said estimated value. For example, the predetermined amount of ink on said first substrate can differ from the estimated value, of the amount of ink for printing the first and/or second master image, of less than the 50%, preferably less than 30% of said estimated value. For example, in the preferred embodiment it is possible that a stock of printed first substrates comprises multiple printed first substrate each comprising a respective predetermined amount of ink, the method then requires selecting the printed first substrate from the stock that has the predetermined amount of ink that is closer, possibly substantially equal, to the predetermined amount.

Preferably, in the method of the invention, water-based inks, even more preferably pigmented water-based inks, are used due to their low cost. In less preferred embodiments, solvent-based ink, oil-based inks or UV curing inks or hydro-UV inks can be used. Preferably said ink provided on the first substrate, covers the majority, and preferably 25 percent or more, even more preferably 50% or more of the surface of first substrate. It is particularly preferred that the ink is a pigmented ink.

Said predetermined amount of ink can be provided on the first substrate according to a pattern. Said pattern can be any kind of drawing, albeit it is preferable that the pattern is close to the first master image. For example, in case the first master image is a wood imitating image, the pattern on the first substrate can be a wood imitating image. In this way the pattern on the first substrate can replicate an ink distribution on the first substrate that is as close as possible to the ink distribution for printing the first master image, while at the same time the first substrate with the pattern can be selected from a stock without the necessity to print the pattern before performing the predetermined operation. With the aim of improving the accuracy of the measurement of said deformation, according to the preferred embodiment said pattern can coincide with the first master image.

It is also possible that the first substrate is printed with multiple patterns, preferably wherein each of said pattern is characterized by a respective predetermined amount of ink. In this way it may be possible to determine the deformation parameter for each different pattern and subsequently modify the first master image, for obtaining the second master image, on the basis of the deformation parameter corresponding to the ink amount that is closer or equal to the ink amount that is needed for printing the second master image, and/or it is possible to determine the ink amount for printing the second master image on the basis of the ink amount of the first substrate that causes a specific deformation, for example the minor deformation.

The first substrate can comprise or be provided with an ink receiver layer before being subjected to said predetermined operation. In case the first substrate is a printed first substrate it preferably comprises the ink receiver layer. Alternatively, in case the method comprises the step of providing the first substrate with the ink, the first substrate can be provided with the ink receiver layer or being previously provided with said ink receiver layer.

Said ink receiver layer can be or be provided in a predetermined amount between 0.5 g/sqm and 5 g/sqm dry Preferably the ink receiver layer comprises at least a pigment. Preferably, said first substrate is provided with 0.2 to 10 $g/m^2$, and preferably between 0.5 and 5 $g/m^2$ dry coating weight of pigment in said ink receiver layer. Preferably said pigment has a BET surface area between 10 and 1600 $m^2/g$, and preferably between 15 and 500 $m^2/g$.

According to the most preferred embodiment, for the pigment of said ink receiver layer at least or mainly silica particles are used.

According to variants, for the pigment of said ink receiver layer at least or mainly particles are used chosen from the list consisting of calcium carbonate, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers.

According to some deviant embodiments, the ink receiver layer can also be pigment free.

Preferably, said first substrate is provided with 0.2 to 7 $g/m^2$, and preferably between 0.5 and 5 $g/m^2$, dry coating weight of a binder in said ink receiver layer. According to the most preferred embodiment, for the binder in said ink receiver layer at least or mainly polyvinyl alcohols are used.

According to variants, the ink receiver layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution.

As stated above preferred binders for the ink receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Preferably, said ink receiver layer has, globally seen, a pigment to binder ratio between 0/1 or 0.01/1 and 25/1, preferably between 0/1 or 0.01/1 and 20/1. It is not excluded that the ink receiver layer is non uniform and shows layerwise or areawise differences in composition, in which case the above values are average values for the totality of the inkjet receiver layer.

The ink receiver layer can further comprise a crosslinking agent. Preferably, the ink receiver layer can preferably comprise a content of crosslinking agent below 5% based on dry weight of the composition. The crosslinking agent can be preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The ink receiver layer can further comprise a dispersant. A dispersant is an oligomer or polymer which stabilize the liquid dispersions of pigment contained in the ink against flocculation. The dispersant can comprise polycarboxylates, polyphosphates, a polyionic polymer, preferably polyDADMAC (Polydiallyldimethylammonium chloride) polyamine or alumina salts.

Preferably, the ink receiver layer is provided with less than 10%, more preferably less than 5% based on dry coating weight of dispersant, for example between 5 and 0%. Preferably, said ink receiver layer has, globally seen, a pigment to dispersant ratio between 10/1 and 100/1.

The ink receiver layer can also comprise a flocculant, preferably a metal salt, preferably a cationic metal salt. Preferably said metal salt is chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate. The positive ion of the dissolved metal salt will tend to neutralize the electrosteric stabilization function of the pigment contained in the ink thereby improving its absorption. The most preferred cationic metal salts are CaCl2, MgCl2, CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetration to far down into the ink receiver layer. Mainly the vehicle of the ink, e.g. the water in the case of waterbased inks, is absorbed deeper down into the ink receiver layer.

Preferably, ink receiver layer is provided with 20 to 60%, based on dry coating weight of flocculating agent, in particular of metal salt.

The ink receiver layer may also comprise one or more of the following agents:

- Agents altering, more particularly lowering, the pH of said ink receiver layer. Preferably the pH of the ink receiver layer composition is lowered to pH 6 or lower, by selecting the amount and type of said agent, which selection is within the ambit of the skilled man. Preferably said agent is chosen from the list consisting of formic acid, tartaric acid, acetic acid, hydrochloric acid, citric acid, phosphoric acid, sulfuric acid, AlCl3 and boronic acid. An adjusted, more particularly lowered pH, preferably to pH 6 or less, increases the chemical affinity of the inkjet receiver layer with the ink and will interfere with the electrosteric stabilization function on the pigment, such that the dispersion of the pigments in the ink will become destabilized quickly.

- Particle surface modifying agents or coupling agents: between 0.05 and 5 g/m$^2$, preferably between 0.2 and 2 g/m$^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.
- Additives: wetting agent between 0.005 and 1 g/m$^2$, preferably between 0.05 and 0.5 g/m$^2$; and/or defoaming agent between 0.005 and 1 g/m$^2$, preferably between 0.05 and 0.5 g/m$^2$; and/or fungicide between 0.005 and 1 g/m$^2$, preferably between 0.05 and 0.5 g/m$^2$.

According to the most preferred embodiment said inkjet receiver layer is present on the first substrate in the form of a unique layer. Anyway, it is not excluded that said inkjet receiver coating is in the form of two layers, wherein respectively a first layer with a first composition and a second layer with a second composition wherein said first and second composition may be either the same or different compositions.

The first substrate can be made of paper.

In case the first substrate is made of paper, it is preferably in form of a paper sheet having a base paper weight, i.e. without ink receiving layer, higher than 20 grams per square meter, preferably between 50 to 100 grams per square meter, e.g. between 60 and 80 grams per square meter. Preferably, the paper sheet comprising the ink receiver layer shows a resin penetration time lower than 3 sec. Preferably, the paper sheet is opaque and/or contains titanium oxide as a whitening agent and/or other inorganic fillers. Alternatively, the paper sheet may be a colored, pigmented and/or dyed base paper. The paper layer can show a mean air resistance as expressed in Gurley value below 40 sec, preferably below 25 sec. Paper showings said mean air resistance are more prone to impregnation with resins.

In some embodiment it is preferred that the paper used for the first substrate is free from inorganic fillers, like whitening agents or pigments, for example titanium oxide. The paper layer can be made of 100 alfa cellulose.

In a special embodiment the first substrate can comprise a paper sheet having a base paper weight, i.e. without ink receiving layer, lower than 50 grams per square meter, preferably between 20 to 50 grams per square meter. The paper layer according to this special embodiment can show a mean air resistance as expressed in Gurley value below 15 sec. The paper layer according to this special embodiment can be used during a "dry press operation" during HPL, CPL or DPL lamination. With dry press it is meant that the printed paper is not impregnated, but it is sandwiched between two paper layers which contain resin and the bonding is performed during lamination.

The predetermined operation can be any operation that is able to cause a deformation of the first substrate. Preferably the predetermined operation can be selected from the group comprising: impregnation, heating, pressing, stretching, lamination or a combination thereof.

In the preferred embodiment, the predetermined operation involves at least impregnating the first substrate with a liquid, preferably a resin, more preferably a thermosetting resin. The thermosetting resin can preferably be a melamine-based resin. Preferably the paper sheet can be impregnated with a quantity of thermosetting resin equaling 40 to 250% dry weight of resin as compared to weight of the paper. Preferably the paper sheet can be provided with such an amount of thermosetting resin, that at least the paper core is satisfied with the resin. Such satisfaction can be reached when an amount of resin is provided that corresponds to at least 1.5 or at least 2 times the paper weight. It should be clear that the resin, which is provided on the paper sheet, is not necessarily only available in the core of the paper, but may form surface layers on both flat sides of the paper. The inkjet receiver coating may then be present on the surface of the paper with the intermediary of such a surface layer of thermosetting resin. Preferably, the obtained resin provided paper layer, i.e. after provision of the thermosetting resin, has a relative humidity lower than 15%, and still better of 10% by weight or lower. Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer. Next to melamine-based resin, other alternatives such as urea-based resin, polyurethane-dispersion resin, acrylate dispersion resin and combinations thereof can be used.

The predetermined operation may also involve hot pressing the printed and resin provided paper sheet, at least to cure the resin. This paper sheet can be hot pressed on top of a substrate, preferably a wood-based substrate like MDF or HDF, so that this hot pressing simulates or is part of a DPL process. It is of course not excluded that this hot pressing simulates or is part of a CPL (Compact Laminate) or an HPL (High Pressure Laminate) process in which the printed paper sheet is hot pressed at least with a plurality of resin impregnated core paper layers, e.g. of so called Kraft paper, forming a substrate underneath the printed paper sheet, and wherein the obtained pressed and cured laminate layer, or laminate board is, in the case of an HPL, glued to a further substrate, such as to a particle board or an MDF or HDF board.

After the second master image is obtained, via the image processing operation, it can be printed on a second support for obtaining a printed layer. The second substrate can be made similarly to the first support, preferably it can be the same of the first substrate. Preferably the second substrate is made of the same material of the first substrate, for example made of paper. It is also preferable that the second substrate comprises one or more features in common with the first substrate, said feature can preferably belong to the group comprising: weight, thickness, Gurley value, resin penetration time, ash content. Within the context of the invention with feature in "common" it is meant the feature, in particular the value thereof, are substantially the same in the first substrate and in the second substrate, and that the value of said features can be slightly different each other, preferably they can differ for less of the 10%, preferably less of the 5%. The inventor has found that more the first and second substrate are similar each other, the higher is the accuracy with which the deformation can be compensated. A difference, between the feature of the second and of the first substrate, that stays below the above-mentioned limit may allow a high accuracy in the compensation of the deformation by using standard first substrate collected in a stock.

Advantageously the second substrate can be provided with an ink receiver layer. Said ink receiver layer of the second substrate can be made similarly to the ink receiver layer of the first support. Preferably the ink receiver layer of the second substrate may comprise the same components than that of the first substrate, for example may comprise the same composition.

Said second master image is preferably printed on the second substrate via digital printing, preferably inkjet printing. Both single pass and multi pass printing are possible, albeit single pass printing provides for a higher productivity. Said printing operation can be performed with water-based inks, solvent-based ink, oil-based inks or UV curing inks or hydro-UV inks can be used. Preferably the ink is a pigmented ink. According to the preferred embodiment the ink used for printing on the second substrate are similar, preferably, the same provided on the first substrate.

in the preferred embodiment, the obtained printed layer can be used as decorative layer in decorative panels, for example floor, wall, ceiling or furniture panel. The said decorative panels may be of the type comprising a support layer and a top layer, the top layer comprising the decorative layer. According to alternative embodiments, the printed layer can be use for decorative surfaces in general, for example wallpaper.

The support layer can be a wood-based board or panel, preferably a such as to a particle board or an MDF or HDF board.

In the preferred embodiment wherein the panel is a floor panel, the method may comprise the step of providing said support layer with coupling elements for mechanical coupling to another floor panel. Said step of providing the support layer with coupling element is preferably performed after that the decorative layer has been provided on the support layer. It is noted that said support layer can also be in form of large board that are cut into multiple laminate panel.

The method of the invention can comprise the step of providing said top layer, including at least said decorative layer, onto said support layer. In particular, the decorative layer can be pressed, heat pressed or glued on top of the support layer. in the most preferred embodiment, the decorative layer is preferably heat pressed on top of the support layer after that it has been impregnated with a resin. Said resin being preferably a melamine-based resin. Said impregnation and/or said heat pressing can be performed substantially in the same way as per the above mentioned predetermined operation.

The top layer can further comprise a wear layer, preferably a transparent layer and possibly comprising hard particles. Said wear layer can comprise a paper sheet impregnated with a resin, preferably the same impregnating the printed layer.

The method of the invention may comprise the step of forming a relief on the surface of said panel. Said relief is preferably formed at least in said top layer. In the most preferred embodiment the relief is in register with the printed décor provided on the printed layer, i.e. the relief has structural feature corresponding to structural features of the printed décor. For example, in case of a printed décor representing a wood imitation the relief has an excavation shaped to imitate a wood pore where the printed décor shows a wood pore. Thanks to the inventive solution proposed herein, it is possible to improve the alignment between the printed décor and the relief since any deformation of the printed décor that can occur before and/or during the alignment of the printed décor with the relief is taken into account.

The relief can be embossed in the top layer during the heat pressing step using an embossment plate or roller. The relief can also be obtained before or after that the top layer is provided on the support layer.

BRIEF DESCRIPTION OF THE DRAWINGS

With the intention of better showing the characteristics according to the invention, in the following, as an example without limitative character, an embodiment is described, with reference to the accompanying drawings, wherein:

FIG. 2 shows a printed substrate;

FIG. 4 shows some steps in a method in accordance with the first aspect of the invention;

FIG. 5 shows in perspective a panel obtained by means of the method of FIG. 6;

DESCRIPTION OF NON-LIMITING EMBODIMENTS

Figures 1A, 1B, 1C, 1D, 1E, 3:
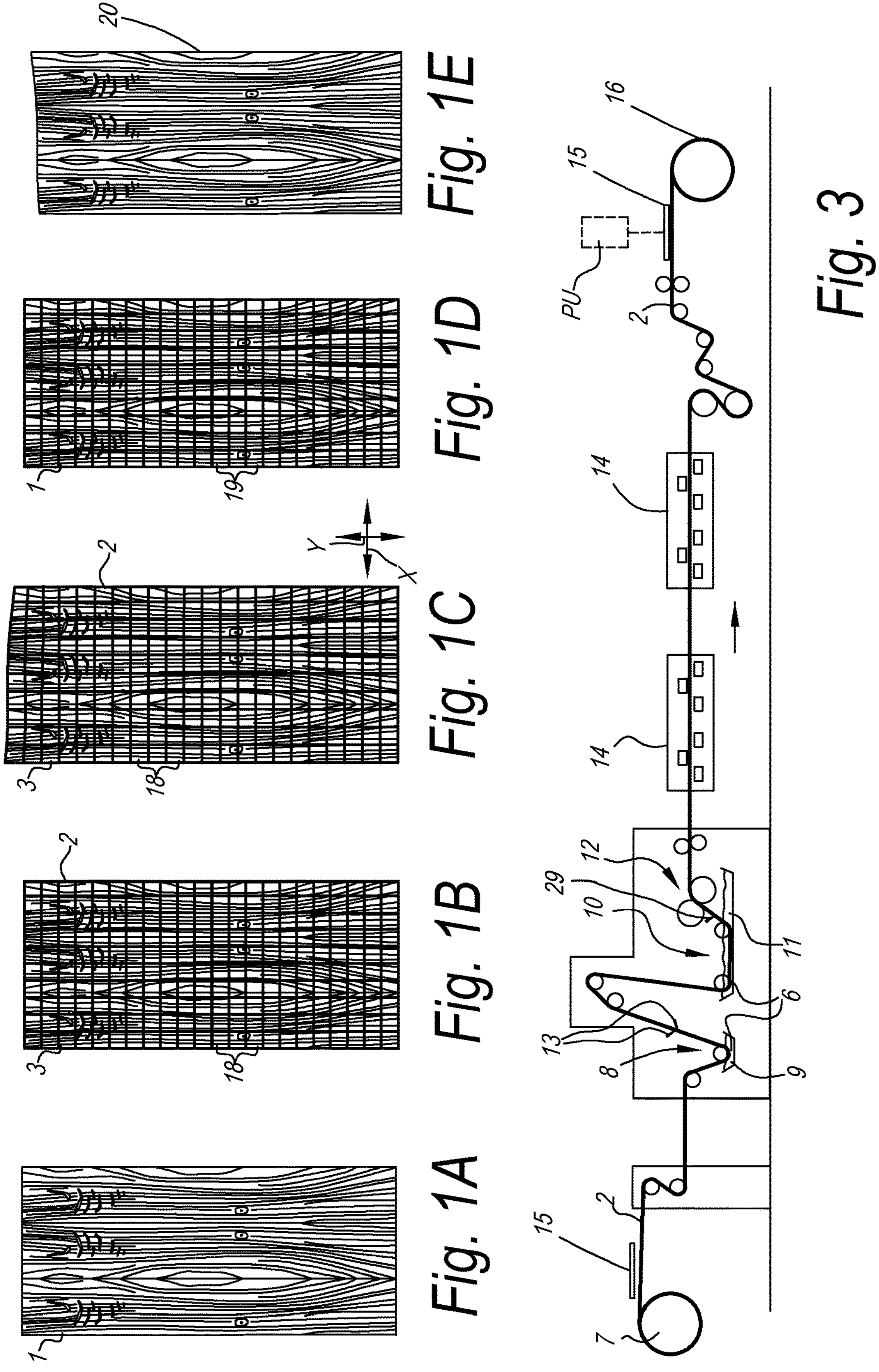
FIGS. 1*a* to 1*e* schematically show some steps in an image processing operation according to the method of the invention.
FIG. 3 shows some steps in a method in accordance with the first aspect of the invention.

FIG. 1 schematically illustrates a first master image 1, in this case representing a wood décor. In the method according to the invention, the first master image 1 is printed on a first substrate 2. illustrated in FIG. 2, for forming a first printed décor 3.

In this example the first substrate 2 comprises a paper sheet 4 having an ink receiver coating 5 on one of its surfaces. The paper sheet 4 comprises a weight of about 70 grams per square meter and a starting Gurley value below 30 s. In the example the ink receiver coating 5 comprises polyvinyl-alcohol as binder, silica particles as pigments and a cationic metal salt chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate.

Said ink receiver coating 5 is provided in a predetermined amount between 0.5 g/sqm and 5 g/sqm on the paper sheet 4.

The first master image 1 is printed on the first substrate 2 by inkjet printing so to provide on said first substrate an amount of ink between 0.01 gsm and 5 gsm dry weight. Ink is preferably water-based pigment containing ink.

After printing, the first substrate 2 is subjected to a predetermined operation shown in FIG. 3. In the example, the predetermined operation involves impregnating the first substrate 2 with a thermosetting resin 6, in particular a melamine-based resin. In particular, the first substrate 2 is taken from a starting roll 7 and transported to a first impregnation station 8 where said first substrate 2 is immersed in a bath 9 of said thermosetting resin 6, more particularly a mixture of water and thermosetting resin composition. The first substrate 2 is then allowed to rest while in this case being transported upwards. The resting allows for the resin 6 to penetrate the core of the paper sheet 4. The first substrate 2 then comes into a second impregnation station 10 where the first substrate 2 is, in this case, again immersed in a second bath 11 of resin 6, more particularly a mixture of water and resin. A set of squeezing rollers 12 allows to dose the amount of resin applied to the first substrate 2.

In the example several doctor blades 13 are available for partially removing resin 6 at the surface of the resin provided first substrate 2.

The first substrate 2 is then dried and its residual humidity level is brought to below 10%. In the example hot air ovens 14 are used, but alternatively other heating equipment can be used, such as microwave or infrared drying equipment. The first substrate is for example subsequently rolled on a second roller 16 or cut into sheets The predetermined operation illustrated in FIG. 3 causes a deformation of the first substrate as illustrated in FIG. 1*c*. In the example, said deformation comprises an expansion of the first substrate 1 in both a longitudinal Y and a transversal X direction of the first substrate. The example it is also shows that the expansion in the longitudinal direction Y may vary along the transverse direction X.

Coming back to FIG. 3, after the predetermined operation, in the example after drying, the first substrate 2 is subjected to a measuring step for measuring the deformation and determine at least a deformation parameter DP. Preferably to determine said deformation parameter DP multiple measurement can be performed, by respective measuring devices 15, in particular before and after said predetermined operation, so that the deformation parameter is defined by the difference between said measured values.

As shown in FIGS. 1*b* and 1*c* a plurality of sectors 18 are identified on the surface of said first printable or printed substrate 1, in particular in said first printed décor 3. Said sectors 18 can be physically identified by printing separating lines on the substrate or by leaving blank areas on the surface of the first substrate 2. Alternatively, the sectors 18 can be only virtually identified. The method involves the step of determining at least one deformation parameter DP for each sector 18.

In the example, the sectors 18 are disposed in a raster manner on a predetermined number of columns 1, 2, . . . i and on a predetermined number of rows 1, 2, . . . j. For each sector 18 is determined the deformation parameter $DP_{i,j}$.

The deformation parameters $DP_{i,j}$ are stored in memory of a processing unit PU (shown in FIG. 3), for example a personal computer. Said processing unit PU performs an image processing operation on the first master image 1 that in the example involves identifying multiple areas 19 of said first master image 1 (FIG. 1*d*), each of them corresponding to a respective sector 1 on the first substrate 2 and involves modifying each area of the first master image 1 on the basis of the respective deformation parameter $DP_{i,j}$. In the example each area is modified on the basis of a respective modification parameter $MP_{i,j}$ that is calculated by the processing unit PU. In the example, the modification parameter $MP_{i,j}$ for each area is the opposite of the respective deformation parameter $DP_{i,j}$: $MP_{i,j}=-DP_{i,j}$.

As a result of said image processing operation a second master image 20 is obtained which is a deformed version of the first master image 1 as shown in FIG. 1*e*. In particular, with relation to example given, the second master image 20 is smaller than the first master image 1.

The method then continues as described in FIG. 4. FIG. 4 illustrates that a second substrate 21, for example in form of a paper sheet 4 may be un-winded from a starting roller 22 and coated with the ink receiver coating 5 in a coating station 23. The second substrate 21 is then fed to an inkjet printer 24. The printer 24, in this example, relates to a printer of the single pass type. The inkjet printer 24 is commanded for printing the second master image 20 on the second substrate 21 thereby forming a second printed décor 25 on said second substrate 21. The printed second substrate 21 is optionally dried in a dryer 26 to finally obtain a printed layer 27 that is subsequently wound up in a second roller 28.

It is noted that the features of the paper 4, of the ink receiver coating 5, of the ink and of the printing parameters are substantially the same as those involved in the manufacturing of the first printed substrate.

The obtained printed layer 27 can be used as a decorative layer 27 in a decorative panel 30 as illustrated in FIG. 5. The obtained decorative panels 30 at least comprise a substrate 31, for example of HDF or MDF, and a top layer 32. The top layer 32 comprises the decorative layer formed by the printed layer 27. In the example the decorative panel 30 is a floor panel comprising coupling means 33 on the long and short edges for coupling with adjacent floor panels in a floor covering. As illustrated in FIG. 5 such coupling means or coupling parts 33 can basically have the shape of a tongue and a groove.

Figure 6:
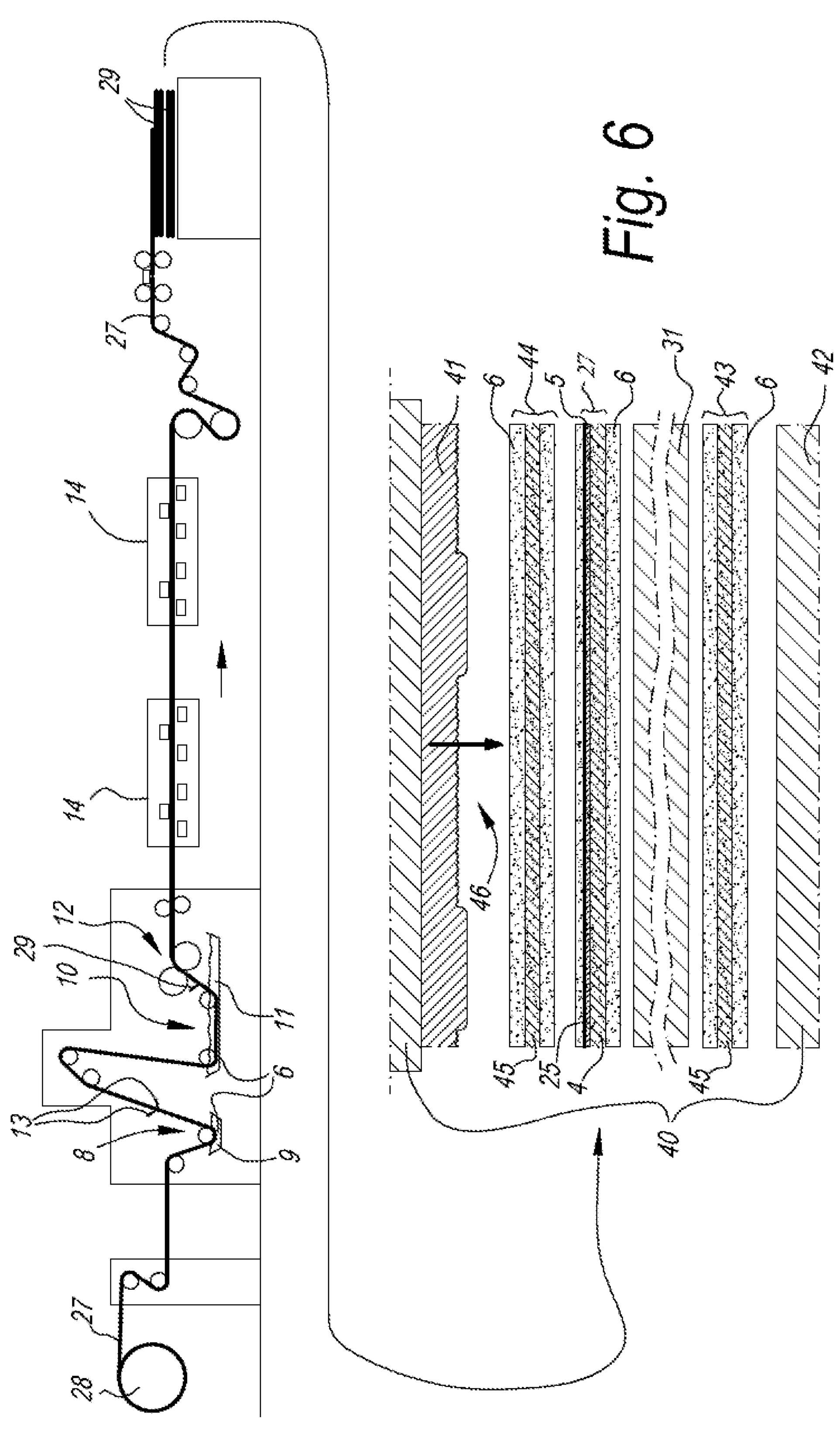
FIG. 6 shows some steps of a method for manufacturing a panel in accordance with a second aspect of the invention.

To this aim the printed layer 27 is used in laminate panel manufacturing process, some steps of which are illustrated in FIG. 6. In particular, FIG. 6 shows that the printed layer 27 is subjected to the above-mentioned predetermined operation, in the example is impregnated with a melamine resin 6. Said impregnation is preferably conducted in the same way as for the first substrate and as described in FIG. 3. In FIG. 6, after drying in the oven 14 the printed layer 27 is cut into sheets 29.

As a result of the said impregnation the printed layer 27 and the printed décor thereof will deform substantially as predicted with the first printed substrate so to recover the shape and dimension of the first master image 1.

FIG. 6 further illustrates that a sheet of the impregnated printed layer 27 is taken up in a stack to be pressed in a short daylight press 40 between upper and lower press plates 41-42. Said stack comprises from bottom to top a counter layer 43, a plate shaped substrate 31, the abovementioned resin provided printed layer 27 and a wear layer 44, wherein the counter layer 43 and the wear layer 44 both comprise a paper sheet 45, in case of the wear layer 44 called overlay paper, and resin 6. The stack is then pressed and the press treatment results in a mutual connection between the constituent layers 27-43-44 including the substrate 31, of the stack, as well as in a hardening or curing of the available resin 6. More particularly here a polycondensation reaction of the melamine-based resin takes place, having water as a by-product.

The upper press plate 41 is a structured press plates having a structure relief 46 that provides a relief in the melamine surface of the panel 30 during the same press treatment, by bringing the structured surface of the upper press plate 41 into contact with the melamine of the wear layer 44. Thanks to the fact that the deformation that occur during the predetermined operation is compensated by the method according to the invention, the relief can be made formed in register with the printed décor with a increased precision thereby leading to an higher quality of the panel.

The present invention is in no way limited to the above described embodiments, but such methods, paper layers, panel may be realized according to several variants without leaving the scope of the invention.

The invention is further disclosed by the following item list as defined by the below numbered items.

1. A method for manufacturing a printed decorative layer (27) comprising the steps of:
   providing a first printable or printed substrate (2) wherein said first printable or printed substrate (2) comprises a paper layer (4);

performing at least one predetermined operation on said first substrate (2), wherein said predetermined operation causes the deformation of the first substrate (2) in at least one direction (X,Y);

measuring said deformation to obtain at least one deformation parameter (DP);

providing a first master image (1);

performing an image processing operation on said first master image to obtain a second master image (20);

printing said second master image (20) on a second printable substrate (21) to obtain the décor sheet (27);

characterized in that said image processing operation involves at least modifying the first master image (1) on the basis of said first deformation parameter (DP).

2.—Method according to item 1, wherein said at least first deformation parameter (DP) is a scale parameter, and in that said image processing operation involves enlarging or reducing one or more dimensions of said first master image (1) on the basis of said least first deformation parameter (DP).

3.—Method according to item 1 or 2, wherein said image processing operation involves deforming said first master image (1) of a deformation that is opposite to the measured deformation.

4.—Method according to any of the preceding items, wherein said image processing operation involves modifying the first master image (1) on the basis of at least a modification parameter (MP) that is function of said first deformation parameter (DP).

5.—Method according to any of the preceding items, wherein said image processing operation involves dividing said first master image (1) into at least two areas (19) and involves modifying at least one of said areas (19).

6.—Method according to item 5, wherein said image processing operation involves modifying each area (19) on the basis of a different modification parameter (MP).

7.—Method according to any of the preceding items, wherein it comprises printing at least a pattern on said first printable substrate (2), preferably said pattern corresponding to the first master image (1).

8.—Method according to any of the preceding items, wherein it comprises printing a plurality of patterns on respective portions of said first printable substrate (2).

9.—Method according to item 8, wherein each pattern of said plurality is printed with a respective predetermined ink amount.

10.—Method according to any of the preceding items, wherein said pattern differs from said first master image (1).

11.—Method according to any of the preceding items, wherein it comprises identifying a plurality of sectors (18) on the surface of said first printable or printed substrate (2) and measuring said deformation to obtain at least one deformation parameter ($DP_{i,j}$) for each of said sectors (18).

12.—Method according to any of the preceding items, wherein said predetermined operation is selected between the group comprising: impregnating, heating, pressing and/or laminating.

13.—Method according to any of the preceding items, wherein said printing operation is performed via inkjet printing.

14.—Method according to any of the preceding items, wherein said printing operation is performed via water-based inks.

15.—Method according to any of the preceding items, wherein said first printable or printed substrate (1) comprises an ink receiver layer (5).

16.—Method according to any of the preceding items, wherein the second substrate (21) is the same of the first substrate (1).

17.—Method according to any of the preceding items, wherein the second substrate (21) comprises one or more features in common with the first substrate (2), preferably said feature in common belong to the group comprising: weight, thickness, Gurley value, resin penetration time, ash content.

18.—Method for manufacturing a panel, preferably a floor, wall, furniture or ceiling panel, comprising the steps of:

providing a substrate (31), preferably wood based substrate;

attaching a decorative layer (27) obtained in the method according to any of the preceding items on said substrate (31).

19.—The method according to item 18, wherein said decorative layer (27) is subject to said predetermined operation.

20.—Decorative layer (27) for decorative panel obtained in the method according to any of the items from 1 to 17.

The invention claimed is:

1. A method for manufacturing a printed decorative layer, the method comprising:

providing a first printable or printed substrate wherein the first printable or printed substrate includes a paper layer;

performing at least one predetermined operation on the first substrate, wherein the predetermined operation causes a deformation of the first substrate in at least one direction, wherein the predetermined operation is impregnation;

measuring the deformation to obtain at least one deformation parameter;

providing a first master image;

performing an image processing operation on the first master image to obtain a second master image;

printing the second master image on a second printable substrate to obtain the decorative layer;

wherein the image processing operation involves at least modifying the first master image on the basis of the at least one deformation parameter.

2. The method according to claim 1, wherein the at least one deformation parameter is a scale parameter; and wherein the image processing operation involves enlarging or reducing one or more dimensions of the first master image on the basis of the at least one deformation parameter.

3. The method according to claim 1, wherein the image processing operation involves deforming the first master image of a deformation that is opposite to the measured deformation.

4. The method according to claim 1, wherein the image processing operation involves modifying the first master image on the basis of at least one modification parameter that is function of the at least one deformation parameter.

5. The method according to claim 1, wherein the image processing operation involves:

dividing the first master image into at least two areas; and modifying at least one of the areas.

6. The method according to claim 5, wherein the image processing operation involves modifying each area on the basis of a different modification parameter.

7. The method according to claim 1, further comprising: printing at least a pattern on the first printable substrate.

8. The method according to claim 7, wherein the pattern differs from the first master image.

9. The method according to claim 1, further comprising: printing a plurality of patterns on respective portions of the first printable substrate.

10. The method according to claim 9, wherein each pattern of the plurality of patterns is printed with a respective predetermined ink amount.

11. The method according to claim 1, further comprising: identifying a plurality of sectors on the surface of the first printable or printed substrate; and measuring the deformation to obtain at least one deformation parameter for each of the sectors.

12. The method according to claim 1, wherein the printing operation is performed via inkjet printing.

13. The method according to claim 1, wherein the printing is performed via water-based inks.

14. The method according to claim 1, wherein the first printable or printed substrate comprises an ink receiver layer.

15. The method according to claim 1, wherein the second substrate is the same as the first substrate.

16. The method according to claim 1, wherein the second substrate comprises one or more features in common with the first substrate.

17. A method for manufacturing a panel, the method comprising:

providing a substrate;

attaching a decorative layer obtained from the method according to claim 1 on the substrate.

18. The method according to claim 17, wherein the decorative layer is subject to the predetermined operation.

19. A decorative layer for a decorative panel obtained from the method according to claim 1.

* * * * *